United States Patent [19]
Jäger

[11] Patent Number: 5,587,787
[45] Date of Patent: Dec. 24, 1996

[54] PROCESS FOR MEASURING RELATIVE ANGLES

[75] Inventor: Heinz Jäger, Volketswil, Switzerland

[73] Assignee: J. Müller AG, Volketswil, Switzerland

[21] Appl. No.: 199,167

[22] PCT Filed: Apr. 15, 1993

[86] PCT No.: PCT/CH93/00097

§ 371 Date: Feb. 22, 1994

§ 102(e) Date: Feb. 22, 1994

[87] PCT Pub. No.: WO94/00778

PCT Pub. Date: Jan. 6, 1994

[30] Foreign Application Priority Data

Jun. 22, 1992 [CH] Switzerland ............ 01965/92

[51] Int. Cl.$^6$ ............ G01B 11/26; G01C 3/08; G02B 26/08
[52] U.S. Cl. ............ 356/141.1; 356/4.08; 356/141.5; 359/226
[58] Field of Search ............ 359/226, 214, 359/215, 220; 356/141.4, 141.1, 4.08, 141.3

[56] References Cited

U.S. PATENT DOCUMENTS

| | | |
|---|---|---|
| 3,594,578 | 7/1971 | Ohman . |
| 3,620,626 | 11/1971 | Daly et al. ............ 356/141.1 |
| 3,788,748 | 1/1974 | Knight et al. ............ 356/141.1 |
| 3,897,151 | 7/1975 | Lecroy . |
| 3,898,445 | 8/1975 | Macleod et al. . |
| 4,277,170 | 7/1981 | Miles . |
| 4,700,301 | 10/1987 | Dyke . |
| 4,830,489 | 5/1989 | Cain et al. ............ 356/141.1 |
| 4,895,440 | 1/1990 | Cain et al. . |
| 5,100,229 | 3/1992 | Lundberg et al. . |
| 5,110,202 | 5/1992 | Dornbusch et al. . |
| 5,146,287 | 9/1992 | Carder ............ 356/141.1 |
| 5,208,647 | 5/1993 | Longa et al. . |
| 5,294,970 | 3/1994 | Dornbusch et al. . |
| 5,309,212 | 5/1994 | Clark . |

FOREIGN PATENT DOCUMENTS

| | | |
|---|---|---|
| 3725896 | 2/1989 | Germany . |
| 2194702 | 3/1988 | United Kingdom . |
| 2213673 | 8/1989 | United Kingdom . |

Primary Examiner—Stephen C. Buczinski
Attorney, Agent, or Firm—Watson Cole Stevens Davis, P.L.L.C.

[57] ABSTRACT

The process for measuring relative angles between a measuring platform and measuring points provides at least one light ray ($f_1$, $f_2$) fanned into a flat band. This light fan is swivelled around an axis of the measuring points light is reflected back to the measuring platform, as soon as the light fan impinges on these reflecting means. The measuring platform has counters, which count continuously until the arrival of a reflecting signal at the measuring platform. The respective next reflecting signal stops at the next provided counter. A counter is provided to count with the same counting pulse, during the entire, predefined angular range, in which the measuring points are to be acquired. From the ratios of the counts stopped by the reflecting signals, to the count of the counter that is still counting, the angle of the corresponding measuring point is calculated. Preferably two light fans ($f_1$, $f_2$) that are preferably at right angles to each other are provided.

7 Claims, 3 Drawing Sheets

PROCESS FOR MEASURING RELATIVE ANGLES

BACKGROUND OF THE INVENTION

The present invention relates to a process for measuring relative angles between a reference direction of a measuring platform and remote measuring points by means of light rays which start from the measuring platform and are reflected back to the measuring platform by reflecting means attached to the measuring points and are received and processed by receiving means provided at the measuring platform. The present invention also relates to measuring devices to implement this process.

For example, to determine the position of a measuring platform with respect to reference points with known positions, the distances between the measuring platform and the reference points are measured. From that, the position of the measuring platform can be determined. Instead of measuring the distances, the angular position of the measuring platform with respect to the reference points can also be measured. On the basis of a surveying plan, this procedure also results in the position of the measuring platform being determined. These angles can be measured starting from either the measuring platform or from the individual reference points. Usually the angles relative to a defined reference direction are measured. To measure these relative angles a manually operable optical angle measuring device is frequently used in the conventional manner.

To measure these relative angles automatically, there exist methods and systems that function with the aid of light transmitters at the measuring platform and reflectors at the reference points. In so doing, a collimated light ray is focused on the reference point, wherein the focusing of this light ray represents directly the desired relative angle with respect to the reference direction. Thus, the position of the measuring platform can be determined with the aid of an existing surveying plan.

The object of the present invention is to find now a simple process for measuring relative angles that runs virtually automatically and can determine rapidly and accurately these relative angles.

SUMMARY OF THE INVENTION

This problem is solved according to the invention in that the departing light ray is optically fanned into a flat band and this band is swivelled around an axis of the measuring platform in a predefined angular range, whereby the evaluating system of the measuring platform has several counters, of which one is operated with a counting pulse from the beginning of the angular range up to its end, and the other counters start to count with the same counting pulse at the beginning of the angular range and stop counting in succession upon receiving the next subsequent reflecting signal from a measuring point; and that from the count ratios between the counter of the angular range and the other counters, the relative angular positions between the beginning of the angular range of the measuring platform and the measuring points are calculated.

Since the light ray is fanned out, only a bypass of this light fan, for example, around a vertical axis is needed in order to obtain within the fan width reflecting signals from measuring points. To date, the light ray had to be focused exactly on the reflecting means. For most applications the corresponding measuring points are also positioned in a relatively narrow horizontal band when seen from the measuring platform. Since the ratio of counts is used to determine the angle, the resulting angle is not a function of the bypass speed of the light ray. The result is very accurate measurement of the angle.

A preferred embodiment of the invention is characterized by the fact that there are two fan-shaped light rays which can be swiveled around the same axis of the measuring platform and which are oriented with respect to each other, preferably at right angles, and that each of these light ray fans has its own group of counters; and the relative angular positions of the measuring points with respect to the reference direction are calculated from the counts. By using two fans with different angular positions with respect to the axis of rotation, the two angles of the measuring points can be determined both with respect to the reference direction in the plane that is perpendicular to the axis of rotation of the measuring platform and also the angle with respect to the axis of rotation. The position of the measuring platform with respect to the measuring points can be determined accurately by means of this information about the angles.

Another preferred embodiment of the invention provides that only specific angular ranges to be selected based on the rough predefinition of the measuring point locations are provided for acquiring the measuring points. In this manner ambiguities resulting from the presence of more than one measuring point can be ruled out. For example, the angular range can be limited during acquisition, in that reflected signals are accepted only in the selected angular range, whereby in particular the angular ranges for the individual counters can be defined specifically, or these angular ranges are not considered until the measurement of the angles is evaluated. Preferably, the angular angles to be selected are stored in a storage component in the measuring platform. Thus, these data are available for automatic evaluation, for example, by means of a computer.

To implement the process the invention provides a device exhibiting at least one light transmitter and also a light-sensitive sensor that is connected to the counters or evaluating means.

Preferably a device is provided wherein at least one light transmitter with a fan lens is arranged in such a manner in a housing, which can be rotated around an axis, that the light axis is perpendicular to the axis of rotation, and that a deflecting mirror with an opening for the light fan of the light transmitter is arranged in such a manner in front of each light transmitter that incident light is guided by means of lens optics, which may or may not exhibit additional interference filters, to the light-sensitive sensor that is disposed in the axis of rotation.

Furthermore there is preferably a device, where at least one light transmitter with fan lens is disposed in such a manner in a housing, which can be rotated around an axis, that the axis of light is perpendicular to the axis of rotation, and that in front of every light transmitter there is a pair of lenses whose optical axes are spaced equidistant from both sides of the optical axis of the light transmitter in the fan plane of the light fan of the light transmitter, whereby the focal point of each lens has the start of a light guide, which guides incident light to the light-sensitive sensor disposed in the axis of rotation. In this embodiment a plurality of light transmitters can be disposed in the housing by means of a very compact type of construction. Thus, the data rate can be significantly increased, a feature that dramatically raises the accuracy of measurements during the process of the measuring system.

Furthermore, the invention provides a device that exhibits a deflecting mirror which can be rotated around an axis, and a fan lens, arranged between the light transmitter and the deflecting mirror, and another stationary deflecting mirror provided with an opening for the light ray of the light transmitter The rotatable deflecting mirror is provided here as the sole moveable part. This means that only a relatively small mass has to be moved, a feature that has a positive effect on the accuracy of the measurement. A preferred embodiment of this device is characterized by the fact that there are two light transmitters disposed in such a manner that the fanned light rays of both light transmitters impinge on one side of the rotatable deflecting mirror, both sides of which have a reflective coating, and that the deflecting mirror is sloped relative to its axis of rotation preferably at a 45° angle.

Preferably, laser light transmitters are used according to the invention.

These devices according to the invention allow a precise measurement of the relative angle of the connection of the measuring platform to a measuring point with respect to the reference direction and from that the accurate determination of the position of the measuring platform, for example, with the aid of a surveying plan.

The present invention is suitable preferably in an especially advantageous manner for surveying tracks. In so doing, the reflecting means are attached to the edge of the track at designated points and the measuring platform is positioned on a surveying car. The position of the measuring platform with respect to the horizontal line is determined by the known method, whereas the angles with respect to the measuring points are measured according to the invention. Thus, with the aid of a surveying plan existing for the tracks, the position of the measuring platform and thus the tracks are determined. The major advantage lies especially in a continuous measurement, which was virtually infeasible with the conventional means.

One embodiment of the invention is explained in detail in the following with reference to the drawings.

DETAILED DESCRIPTION OF THE PREFERRED EMBODIMENT

First, the principle of the process according to the invention is depicted with the aid of the measurement with a light fan. One starts from a measuring platform M, for which an angular range for measuring 0° to 180° has been defined, the reference direction R also representing the start of the angular range. Within the angular range are two measuring points A and B with reflecting means, as shown diagrammatically in the top view of FIG. 1. The light ray fan L is swung counterclockwise around a vertical axis through the measuring platform M. In so doing, the light fan is fanned out in such a manner here that the plane of the fan is parallel relative to the axis of rotation. The width of the fan is indicated by dashed lines in the side view of FIG. 2. If the light fan passes through the reference direction R, a counter $Z_1$ and two other counters $Z_2$ and $Z_3$ start to count with a predefined, constant counting pulse see FIG. 8. As soon as the light fan was swung around the angle $\alpha$, light is reflected through the measuring point A and thus the counter $Z_2$ is stopped. As soon as now the light fan L is swung further as far as angle $\beta$, the counter $Z_3$ is also stopped on account of the reflection through the measuring point B. At the end of the angular range, at 180° in this case, the counter $Z_1$ is also stopped. Of course, other counters Zn can also be present in the measuring platform M in order to evaluate a larger number of measuring points. From the ratios of the counts of $Z_1$ and $Z_2$, or $Z_1$ and $Z_3$ and the predefined angular range, the angles $\alpha$ and $\beta$ can be accurately determined:

$$\alpha = 180° * \frac{Z_2}{Z_1}$$

or $$\beta = 180° * \frac{Z_3}{Z_1}$$

At the same time the accuracy is a function of the speed of revolution of the light fan L. If, for example, the counting pulse is 180,000/sec; and the speed of revolution of the light fans is 0.5 revolutions per second, then the count of the counter $Z_1$ would be ideally 180,000. If now the speed of revolution is slightly modified, so that, for example, the count of counter $Z_1$ is only 160,000, the counts of counters $Z_2$ and $Z_3$ would also change in the same proportion and the angle obtained would remain the same.

Since the clock frequency is produced usually by means of electronic components that function with very high accuracy, the accuracy of the measuring procedure is very high. Thus, the fluctuation in the speed of the light fan can be almost totally compensated for.

Figure 1:
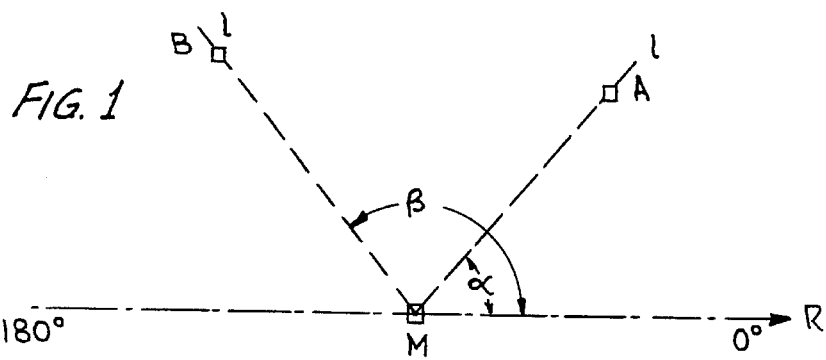
FIG. 1 is a top view of a measuring system with measuring platform and two measuring points.
Figure 2:
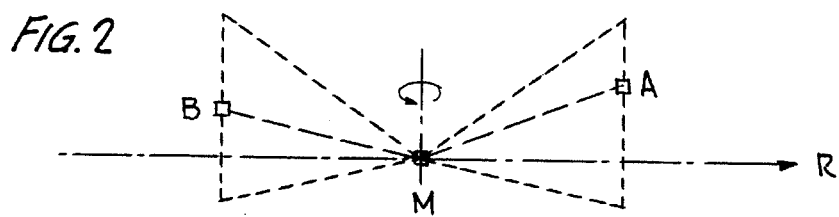
FIG. 2 is a side view of FIG. 1.

It is clear from FIGS. 1 and 2 that with only one light fan, only that angle whose measuring platform is the center can be measured in the plane spread out vertically relative to the axis of rotation.

Figure 3:
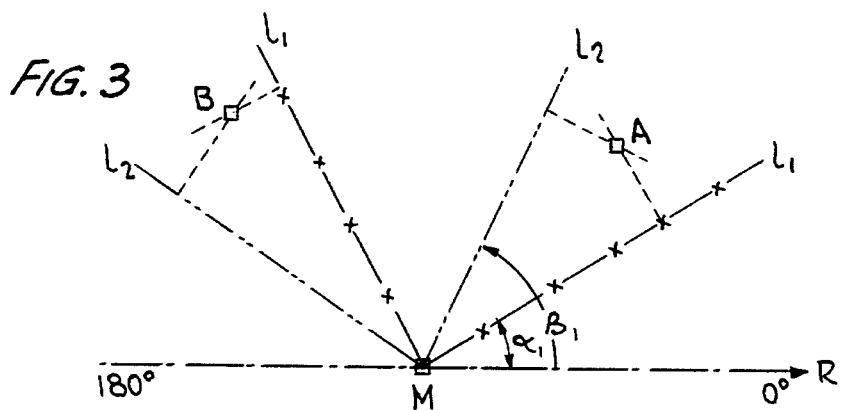
FIG. 3 is a top view of a measuring system with two light fans.

For applications requiring the complete relative angle, the invention can provide two light fans, which are preferably at right angles to each other. FIG. 3 is a diagrammatic drawing of such an arrangement with the same measuring points A and B as shown in FIGS. 1 and 2. A light fan $L_1$, which is tilted relative to the horizontal plane by an angle of 45°, is swung counterclockwise again, as described above, around the axis of the measuring platform. Upon reaching the angle $\alpha_1$, a part of the light is beamed back from the measuring point A and thus the related first counter $Z_2$ is stopped. FIG. 3 also shows with a line interrupted by crosses the intersecting line of the light fan $L_1$ with the horizontal plane. Upon reaching the angle $\alpha_2$, the light is correspondingly reflected back from the measuring point B and the next counter $Z_3$ is stopped. At this stage a second light fan $L_2$ is swung in the same direction around the same axis. It can take place simultaneously or be offset in time. This light fan is preferably at right angles to the orientation of the first light fan $L_1$. In an advantageous manner the second light fan $L_2$ follows at a distance of 180° from the light fan $L_1$. In so doing, the reflections from the measuring points A and B occur at the angular positions $\beta_1$ and $\beta_2$ of the light fan $L_2$. These positions are also acquired with three other counters $Z_4$ to $Z_6$, as described above.

Figure 4:
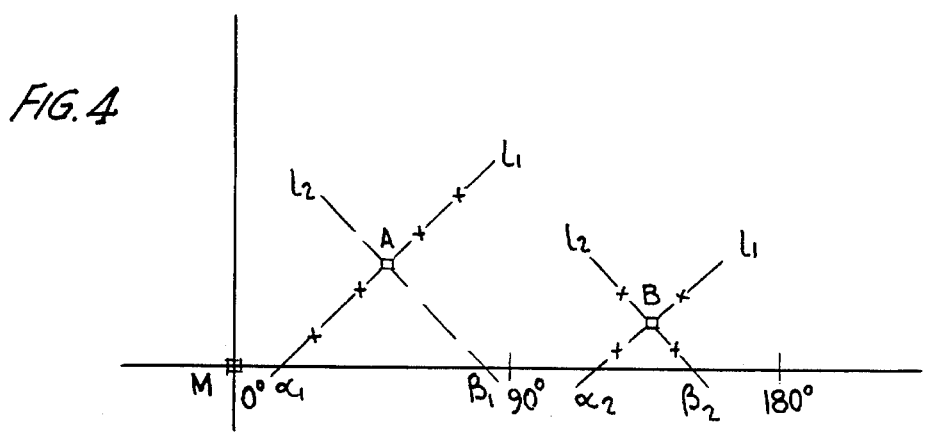
FIG. 4 depicts a diagrammatic evaluation of the measurement according to FIG. 3.

FIG. 4 shows now graphically the evaluation of these angular positions. The measuring points denote graphically the intersecting points of the light fan lines $L_1$ and $L_2$, which are plotted on a graph for a received reflecting signal. Because at this stage there are more intersecting points of these lines than effective measuring points for more than one existing measuring point, the superfluous voids have to be eliminated. This is done preferably by permitting such intersecting points only in the angular ranges to be determined. These angular ranges are determined on the basis of a rough predefinition of the position of the measuring points. For example, when tracks are surveyed, the related surveying plan is used in which the locations of the measuring points are plotted.

Instead of classifying the measuring points based on the angular positions (basis: rough plan), it can also be done according to their distance from the measuring platform by selecting according to the intensity of the reflected light.

For example, the entire evaluation can be done, for example, by means of a computer, whereby the rough predefinition of the position of the measuring points can be available, for example, in a storage for the evaluation.

With the process of the invention it is also possible, in particular, to conduct continuously the measurements of the angles from a constantly moving measuring platform. This feature represents a great advantage in the aforementioned survey of tracks, for example, during repair or replacement work.

Preferably, a laser light transmitter is used as the light source. Thus, even with a relatively low energy requirement adequate reflecting power can be obtained even with longer distances. The suitable optics have in an advantageous manner filters to eliminate the interference signals which can be induced by sunlight glares.

Figure 5:
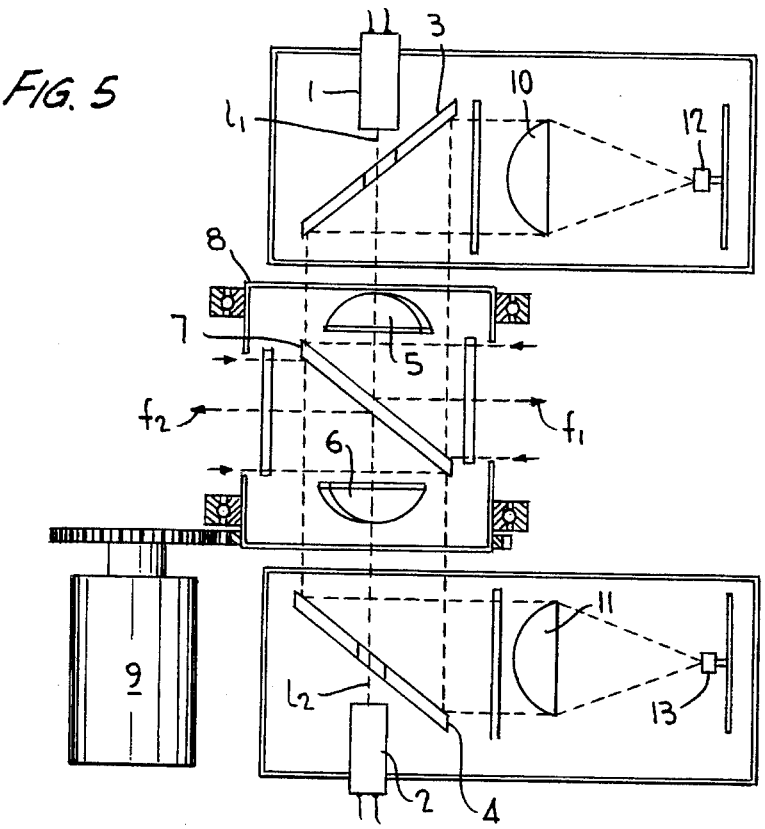
FIG. 5 is a diagrammatic cross sectional view of an angle measuring device according to the invention.

FIG. 5 is a diagrammatic cross sectional view of an angle measuring device according to the invention using two light fans for the measurement. There are preferably two light transmitters 1 and 2, preferably laser light transmitters, which emit a collimated light ray $L_1$ and $L_2$. The light rays travel through openings in the deflecting mirrors 3 and 4 to the fan lenses 5 and 6. These fan lenses 5, 6 are designed as cylindrical lenses and fan the collimated light rays $L_1$ and $L_2$ into flat light bands $f_1$ and $f_2$. At the same time, the two fan lenses are aligned at right angles to each other, so that the two light bands $f_1$ and $f_2$ are also at right angles. The light bands are deflected by 90° by way of a deflecting mirror 7, both sides of which has a mirror coating, and emerge from the housing 8 of the angle measuring device. The housing member 8 can be rotated by means of a drive motor 9. Thus, the light bands $f_1$ and $f_2$ can be kept continuously cycling. The width of the light bands is limited by both the fan lens and the dimension of the housing, but is kept so big that all of the measuring points to be acquired can be covered. A signal reflected by the measuring points enters the housing member 8 and is deflected by way of both deflecting mirrors 7 and 3 or 4 upon the collecting lenses 10 or 11 that focus the signal on the light sensitive sensors 12 or 13. These sensors deliver finally the signal to stop the counters, as described above. Various filters are also provided in the light path in order to avoid a misinterpretation of the interference signals, induced, for example, by such glares.

Figure 6:
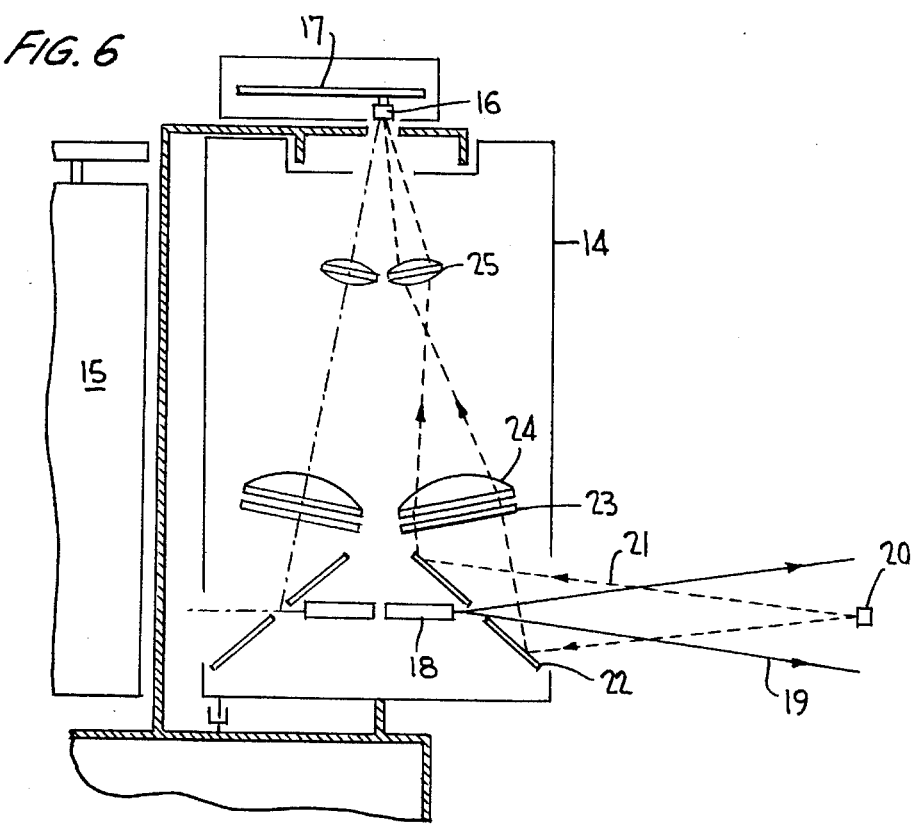
FIG. 6 is a diagrammatic cross sectional view of another angle measuring device according to the invention.

FIG. 6 depicts another preferred embodiment of the measuring device according to the invention. Here a cylindrical, axially rotatable housing 14 is set rotating by means of an electric motor 15, for example, by way of a belt drive. A light-sensitive sensor 16 is positioned stationarily in the axis of rotation of the housing 14 at its bearing frame together with the evaluating electronics 17. A laser light transmitter 18, which emits a light fan 19, is disposed vertically to the axis of rotation in the housing 14. This light fan 19 is tilted according to the above description. The light 21 reflected from a measuring point 20 (shown with a dashed line) is focused on the sensor 16 by way of a deflecting mirror 22 and a lens arrangement 24, 25. At the same time there is, for example, an interference filter 23 in order to filter out the disturbances. Preferably, the housing has a plurality of light transmitters 18, for example 4, whereby the planes of the light fans of the neighboring transmitters 18 are oriented preferably at right angles to each other. Of course, the drive of the housing 14 can also be arranged in such a manner that the range of measurement, i.e., the emission range of the light transmitters 18, is totally guaranteed.

Figure 7:
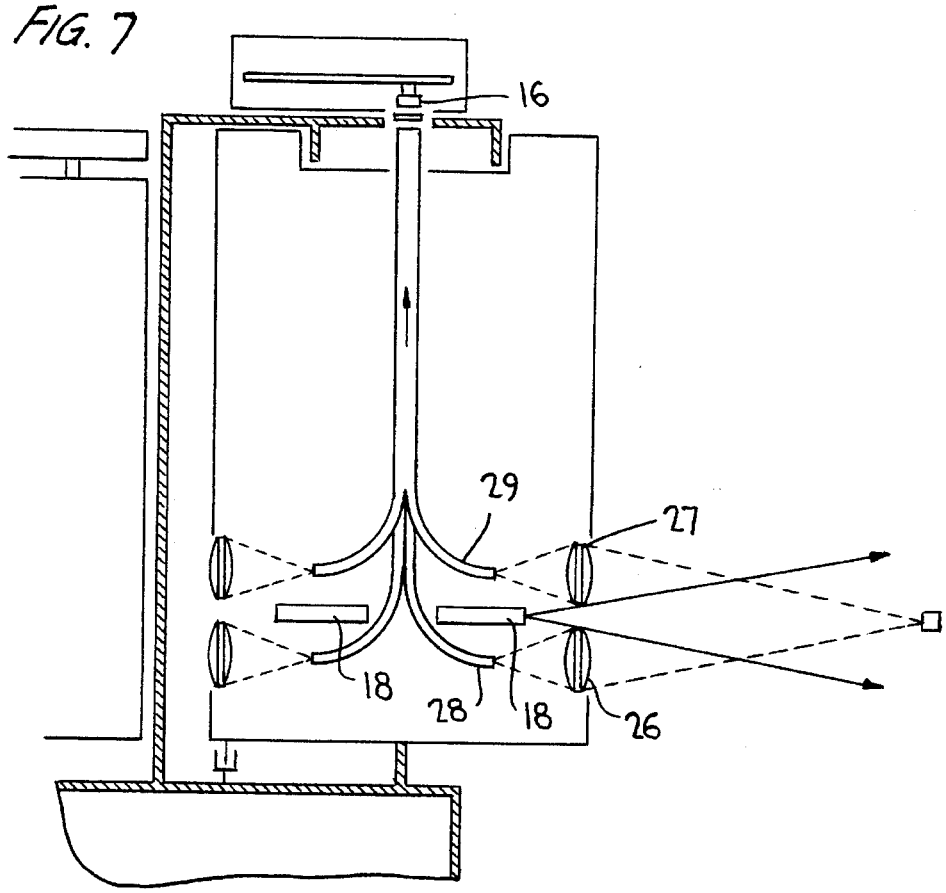
FIG. 7 is a diagrammatic cross sectional view of still another angle measuring device according to the invention.

FIG. 7 shows once again a preferred embodiment of a measuring device according to the invention. The construction is essentially the same as in the case of the device described in FIG. 6. Only the receiving element was modified in that, instead of a deflecting mirror, there are two lenses 26, 27, which are focused directly on the start of the light guide fibers 28, 29. The light fibers guide finally the received light signals to the sensor 16. Here, for example, a filter 30 is arranged directly in front of the sensor 16. The advantage of this arrangement lies especially in the possibility of a plurality of transmitters 18, thus increasing the data throughput and thus increasing the accuracy of the measurement. Another advantage lies in the short focal distances of the lenses 26 and 27 that are used here.

Figure 8:
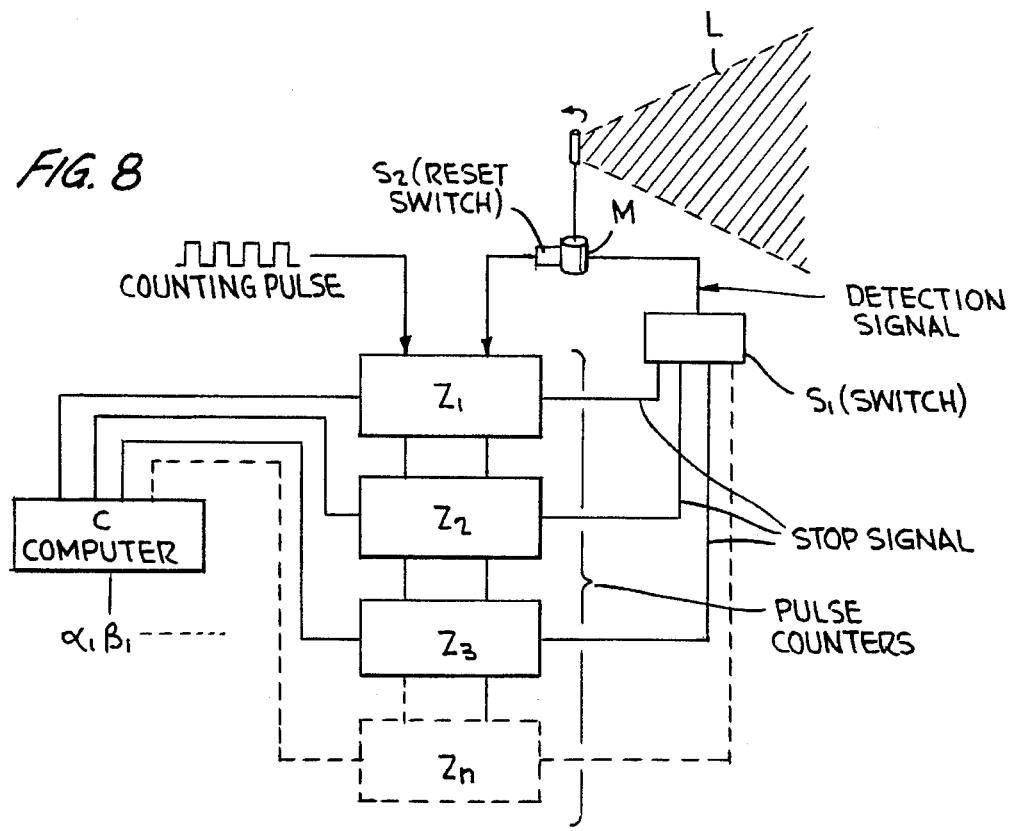
FIG. 8 is a schematic diagram of the inventive measuring apparatus, including evaluation means with pulse counters and computer for comparing time pulse counts.

FIG. 8 shows a diagram of the evaluation means with pulse counters $Z_1, Z_2, Z_3 \ldots Z_n$, and computer C connected to measuring platform M through stop switch $S_1$ and reset switch $S_2$. When light ray fan L passes through a reference direction a signal is sent to counters $Z_1, Z_2, Z_3 \ldots Z_n$ to commence counting, and when detection signals due to reflection of the light ray fan L encountering measuring points is sent to switch $S_1$, the counters are sequentially stopped, with counter $Z_1$ stopped when the light fan ray passes through the end of the angular range. The computer C determines the angles of the measuring points relative to the reference direction. A reset signal from reset switch $S_2$ operates to reset the counters to a start (zero) setting.

I claim:

1. A measuring apparatus for measuring relative angles between a reference direction of a measuring platform and remote points using light rays which emanate from the measuring platform, said measuring device including:

a housing which is mounted for rotation about a rotation axis, a first light transmitter mounted in said housing for emitting a first fan ray of light from said housing such that a light ray thereof which defines an axis of said first fan ray of light is perpendicular to said rotation axis, a first lens mounted on said housing to receive light reflected from said first fan ray of light by a remote point, a first fiber optic light guide located in said housing, said first fiber optic light guide extending along said housing axis and defining a first end for receiving light from said first lens and a second end for emitting light therefrom, a light-sensitive sensor for receiving light passing out of said second end of said first fiber optic guide, and evaluation means including a pulse counter connected to said light-sensitive sensor for counting time pulses from when said first fan ray of light passes through a reference direction at a start of an angular range of rotation to (a) when light reflected from said remote points is guided by said first optic light guide to said sensor and (b) when said first fan ray of light passes through an end of said angular range of rotation, and a computer means for comparing said time pulse counts to determine relative angles between said reference direction and said remote points.

2. A measuring apparatus as claimed in claim 1, including a second light transmitter mounted in said housing for emitting a second fan ray of light from said housing which is perpendicular to said first fan ray of light, said second fan ray including a light ray which defines an axis of said second fan ray which is perpendicular to said rotation axis, a second lens mounted in said housing to receive light reflected from said second fan ray of light by a remote point, a second fiber optic light guide located in said housing, said second fiber optic light guide extending along said housing axis and defining a first end for receiving light from said second lens and a second end for emitting light therefrom onto said light-sensitive sensor.

3. A measuring apparatus as claimed in claim 1, including a light filter means between said second end of said first fiber optic light guide and said light-sensitive sensor.

4. A measuring apparatus as claimed in claim 1, wherein said first light transmitter is a laser.

5. A measuring apparatus for measuring relative angles between a reference direction of a measuring platform and remote points using light rays which emanate from the measuring platform, said measuring device including:

a light-sensitive sensor, a housing which is mounted for rotation about a rotation axis, a first light transmitter for emitting a first fan ray of light from said housing such that a light ray thereof which defines an axis of said first fan ray of light is perpendicular to said rotation axis, a first lens mounted in said housing to receive light reflected from said first fan ray of light by a remote point, said first lens directing light passing therethrough toward said light-sensitive sensor, a second light transmitter for emitting a second fan ray of light from said housing which is perpendicular to said first fan ray of light, said second fan ray of light including a light ray which defines an axis of said second fan ray which is perpendicular to said rotation axis, a second lens mounted in said housing to receive light reflected from said second fan ray of light by a remote point, said second lens directing light passing therethrough toward said light-sensitive sensor, and evaluation means including a pulse counter connected to said light-sensitive sensor for counting time pulses from when said fan rays of light passes through a reference direction at a start of an angular range of rotation to (a) when light reflected from said remote points is received by said sensor and (b) when said fan rays of light passes through an end of said angular range of rotation, and a computer means for comparing time pulse counts to determine relative angles between said reference direction and said remote points.

6. A measuring apparatus as claimed in claim 5, wherein said first and second light transmitters are mounted in said housing.

7. A measuring apparatus as claimed in claim 6, wherein said light-sensitive member is positioned on said rotation axis.

* * * * *